Sept. 11, 1951 P. GRECO 2,567,374
SPRING LOADED JAW SPLICE
Filed July 8, 1946 2 Sheets-Sheet 1
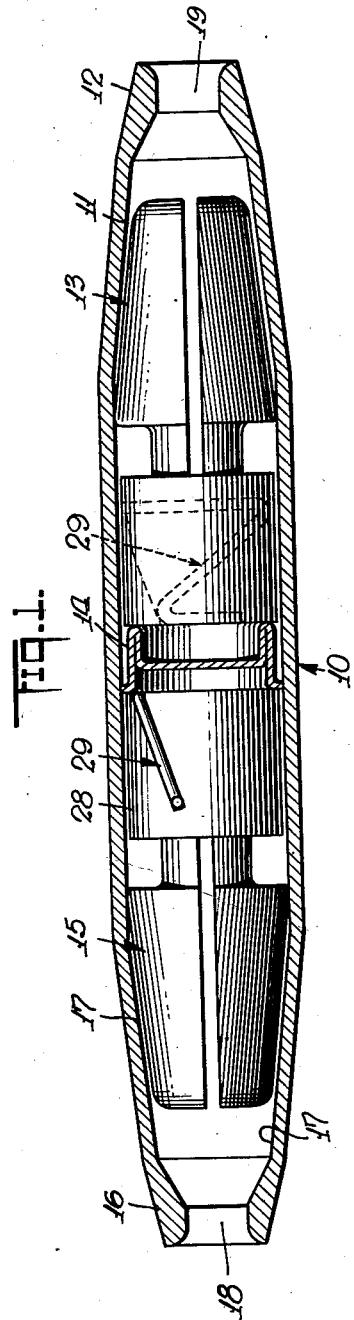
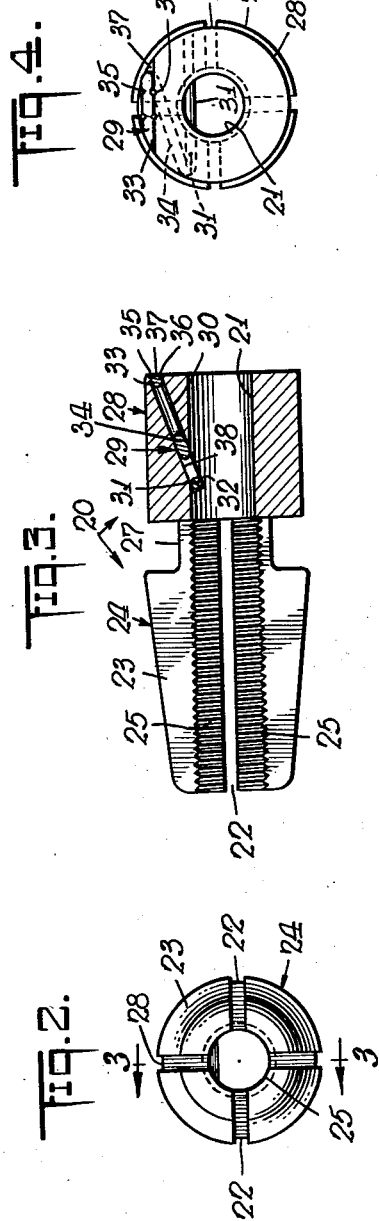
INVENTOR
Peter Greco
BY
Harry Ernest Rubens
ATTORNEY Sept. 11, 1951        P. GRECO        2,567,374
SPRING LOADED JAW SPLICE
Filed July 8, 1946        2 Sheets-Sheet 2
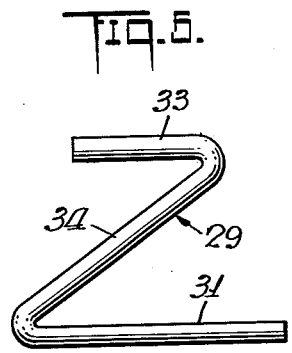
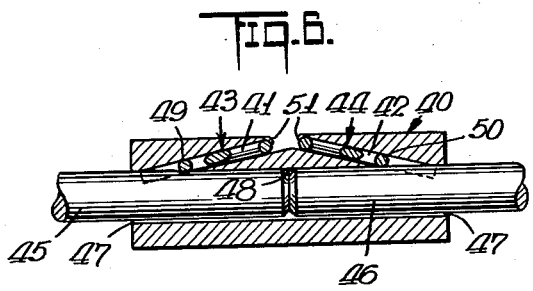
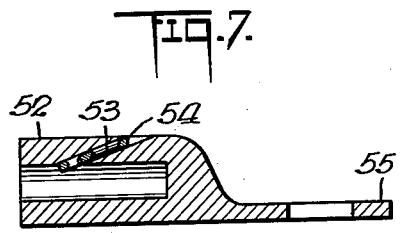
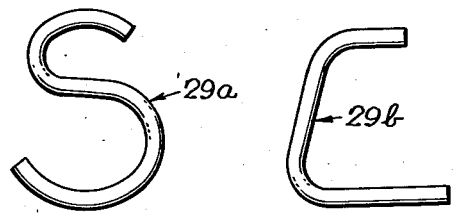
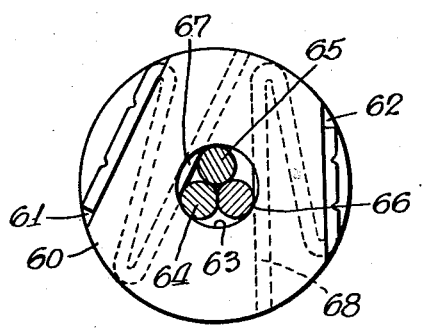
INVENTOR
*Peter Greco*
BY
ATTORNEY Patented Sept. 11, 1951

2,567,374

UNITED STATES PATENT OFFICE 2,567,374

SPRING LOADED JAW SPLICE

Peter Greco, New York, N. Y.

Application July 8, 1946, Serial No. 682,093

7 Claims. (Cl. 24—126)

My invention relates generally to automatic line splice connectors such as are used for splicing electrical wires and cables subject to high tensional stresses, and more specifically to novel means for preventing the separation of the wire from the connector when the applied mechanical tension is small.

Automatic line splices hitherto employed generally comprise main gripping jaw units fitting into the tapered ends of metallic tubing. A center spring operates against opposed sets of gripping jaws to move the jaws into the tapered ends to grip the wire before the tension is applied. It has been found that a spring pressure sufficient to overcome the friction caused by corrosion, and foreign material in the tubing, made it difficult to initially insert the wire into the jaws.

The principal object of my invention is to provide means for wedging the wire to the connector so that the splices will operate at low tensions without necessitating excessive pressures to insert the wire into the splice.

I have also found that it is possible to employ my novel means in conjunction with the usual type of gripping jaws to replace the intermediate spring, thus acting as a positive initial grip which will hold the wire in position until the main jaws function.

Accordingly, a further object consists in providing an auxiliary gripping means for the main gripping jaws to grip the wires at low mechanical tension to prevent loss of the wire end, until the main jaws become effective.

Further objects consist in providing automatic means for gripping the wire at low mechanical tension, which means occupy little additional space over that needed for the main jaws; which does not add to the diameter of the casing, and which can be manufactured at relatively low cost.

I accomplish these and other objects and obtain my new results as will be apparent from the device described in the following specification, particularly pointed out in the claims, and illustrated in the accompanying drawing in which:

Fig. 1 is a longitudinally sectioned view of a tubular splice connector having opposed jaw units employing my invention;

Fig. 2 is a front end view of a jaw unit;

Fig. 3 is a longitudinal sectioned view taken through 3—3 of Fig. 2;

Fig. 4 is a rear end view of the same;

Fig. 5 is a front elevation of a Z-shaped wedging spring;

Fig. 6 is a longitudinal sectioned view of a tubular housing employing my invention;

Fig. 7 is a front elevational view of a terminal connector employing my invention;

Fig. 8 is a front elevation of an S-shaped wedging spring;

Fig. 9 is a similar view of a C-shaped wedging spring;

Fig. 10 is a rear end view of a housing employing out-of-phase wedging means.

Referring to the drawing, reference numeral 10 designates the tubular casing forming the envelope of my splice connector which contains the taper 11, at one end 12 thereof, and into which casing is inserted the jaw unit 13, the separator 14 and finally the jaw unit 15 in opposed relationship to jaw unit 13. The final tapering operation on the end 16 causes the taper 17 to confine the jaw units and separator within the splice.

Openings 18 and 19 permit the wire ends, not shown, to be inserted into the splice at either end.

A sectional view of a jaw unit 20 is shown in Fig. 3. It comprises a cylindrical body section having a central bore 21, and longitudinal slots 22 extending sufficiently into the jaw unit to form finger-shaped jaws 23. The jaws are tapered as at 24 on the backs thereof to engage the inside tapered surfaces of the tubular splice. The inner surfaces 25 of the bore may be threaded or serrated to assist in the gripping action of the jaw.

The flexibility of the jaws created by the slots is increased by the annular groove 27 positioned in the back of the jaw unit to form a "weak back." The slots 22 extend into the remainder of the jaw unit and substantially up to the rear portion thereof. The rear of the jaw unit constitutes the housing 28 and has a diameter slightly less than the diameter of the tubular casing 10, to permit a free movement therein.

As shown in Fig. 3 of the drawing, the housing 28 contains the auxiliary gripping means 29 seated in a slot 30 which starts at the top rear of the housing and cuts obliquely into the bore 21, in the direction of the jaws 23. The slot 30 forms a pocket for the auxiliary gripping means or Z-shaped wire type of spring 29 shown in Fig. 5, the bottom leg 31 of the Z-shaped spring resting on the bottom surface 32 of the slot, which cuts transversely across the path of the inserted wire end, as shown in Figs. 2, 3 and 4. The upper parallel leg 33 of the spring is connected to the lower leg 31, by the intermediate leg 34, and the spring is maintained in position under compression, by peening over the lips 35 and 36 of the mouths of the cut at the entrance 37 thereof.

In this position, when the wire end is inserted into the bore 21, which is slightly larger in diameter than the wire end, it presses against the leg 31 which gives way and is cammed into position to allow the wire end to pass.

When a slight pull-out force is applied to the wire end, the leg 31 becomes wedged between the conductor wire and the wall 38 of the slot by reason of its spring action. The leg 31 will then bite into the softer metal of the copper conductor and prevent slippage of the wire end in the housing 28. Thus the jaw unit will be pulled into the taper of the casing, thereby compressing the tapered end of the jaws over the wire end to grip the conductor against further increases of tension.

By proper selection of the angle of the slot 30, the Z-shaped spring may be made to wedge instantly the conductor to the housing and resist pull-out until the force is sufficient to distort the spring wire badly. I have found that the wire and slot can be designed to resist pull-out values of hundreds of pounds. Specifically, a slot making an angle of 15° with the axis of the bore is satisfactory, although the angle may vary between 0° and 90°.

The jaw units may be made of copper and the spring of Phosphor bronze to prevent corrosion. The spring pressure is just sufficient to wedge the spring in position and may exert a pressure in the order of a few pounds when compressed in the slot.

The separator 14 merely serves to keep the adjacent wire ends apart to avoid interference in the spring and jaw actions.

I have described in the foregoing, a combined jaw and auxiliary grip for the wire end for use in the ordinary connector splice. In Fig. 6 I have shown a tubular housing 40 having obliquely formed slots 41 and 42 into which springs 43 and 44 may be placed, respectively, functioning similarly to the spring 29 in the housing 28 of Fig. 3.

The wire ends 45 and 46 are inserted into the bore 47 of the tubing until it reaches the stop 48 positioned between the slots. Upon applying tension to the two wire ends, the legs 49 and 50 will wedge the wire ends to the housing and prevent removal. The adjacent openings of the slots may be peened over as at 51 to prevent the springs from being released.

It is thus possible to devise a simple wedge to lock a wire end inside a hollow structure in a positive manner. Instead of a tubular splice, the housing may provide only a single opening, and be employed as a terminal, as shown in Fig. 7, wherein the housing 52 having the slot 53 and spring 54 is formed at one end thereof into a flat terminal stud 55.

The spring may be Z-shaped as shown in Fig. 5 or S-shaped, 29a, as in Fig. 8, or U-shaped, 29b, as in Fig. 9, each providing springy action for the leg transversely extending across the path of the wire end.

Instead of one slit, two or more slots can be employed, as illustrated in Fig. 10, wherein the housing 60 is provided with slots 61 and 62. A stranded wire end is inserted into the central bore 63 being illustrated as containing strands 64, 65 and 66. The slots should be so arranged that the resulting line of force exerted by the two legs 67 and 68 of the spring will cause the conductor to be seated against the housing. By thus aligning the slots in an out-of-phase relationship, it will be possible to exert the maximum gripping effect on at least a part of the conductor.

Instead of a conductor wire, any rod-like end may be inserted into the opening of the housing to be secured thereto.

I have thus described my invention, but I desire it understood that it is not confined to the particular forms or uses shown and described, the same being merely illustrative, and that the invention may be carried out in other ways without departing from the spirit of my invention, and, therefore, I claim broadly the right to employ all equivalent instrumentalities coming within the scope of the appended claims, and by means of which, objects of my invention are attained and new results accomplished, as it is obvious that the particular embodiments herein shown and described are only some of the many that can be employed to attain these objects and accomplish these results.

I claim:

1. A connector for securing a rod-like end thereto comprising a housing having a bore for inserting the rod-like end therein, said housing having a slot positioned obliquely with respect to the longitudinal axis of the bore and extending from the outside surface of the housing to the inner surface of said bore; and a wire spring having at least two legs positioned in said slot, one leg thereof extending transversely across said bore and the other leg thereof being caught in said slot to prevent removal therefrom, said legs of said spring being spring-biased toward each other when positioned in the slot, whereby the leg extending across said bore will be wedged between said rod-like end and said housing preventing removal therefrom when the rod-like end is inserted into said bore past said leg, the external opening of said slot being of a size to permit the wire spring to be inserted through the slot.

2. The connector of claim 1, wherein the housing terminates in an extending flat terminal stud.

3. The connector of claim 1, wherein the spring is substantially Z-shaped.

4. The connector of claim 1, wherein the spring is substantially C-shaped.

5. The connector of claim 1, wherein the housing and wire spring are enclosed within a tapered tubular casing, said casing having an opening for the insertion of the rod-like end, said housing having associated therewith tapered jaw members for longitudinal movement in the tapered casing thereby compressing the jaws about the rod-like end, when the housing and jaw members are pulled towards the opening in the tapered shell by the rod-like end.

6. The connector of claim 5, wherein the housing and associated jaw members are integrally connected.

7. The connector of claim 6, wherein the housing and jaw members are circumferentially grooved intermediate each other to permit greater gripping movement of the jaw members.

PETER GRECO.

REFERENCES CITED

The following references are of record in the file of this patent:

UNITED STATES PATENTS

| Number | Name | Date |
|---|---|---|
| 643,346 | Capwell | Feb. 13, 1900 |
| 751,345 | Saunders | Feb. 2, 1904 |
| 1,618,851 | Thunberg et al. | Feb. 22, 1927 |
| 2,069,377 | Matthiessen | Feb. 2, 1937 |
| 2,187,230 | Frank | Jan. 16, 1940 |
| 2,253,018 | Cowles | Aug. 19, 1941 |
| 2,374,875 | McMurphy | May 1, 1945 |

FOREIGN PATENTS

| Number | Country | Date |
|---|---|---|
| 1,880 | Great Britain | of 1913 |